US011250032B1

(12) United States Patent
Moss et al.

(10) Patent No.: US 11,250,032 B1
(45) Date of Patent: Feb. 15, 2022

(54) DATA PREPARATION USER INTERFACE WITH CONDITIONAL REMAPPING OF DATA VALUES

(71) Applicant: Tableau Software, Inc., Seattle, WA (US)

(72) Inventors: Randall Moss, Seattle, WA (US); Jingwei Qi, Kirkland, WA (US); Andy Yu-Lun Lin, Bellevue, WA (US); Andrew Concordia, Seattle, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 520 days.

(21) Appl. No.: 16/228,680

(22) Filed: Dec. 20, 2018

Related U.S. Application Data

(60) Provisional application No. 62/748,995, filed on Oct. 22, 2018.

(51) Int. Cl.
| | | |
|---|---|---|
| *G06F 16/00* | (2019.01) | |
| *G06F 16/28* | (2019.01) | |
| *G06F 3/0482* | (2013.01) | |
| *G06F 16/901* | (2019.01) | |
| *G06F 16/22* | (2019.01) | |
| *G06F 16/25* | (2019.01) | |

(52) U.S. Cl.
CPC .......... *G06F 16/287* (2019.01); *G06F 3/0482* (2013.01); *G06F 16/221* (2019.01); *G06F 16/252* (2019.01); *G06F 16/9024* (2019.01)

(58) Field of Classification Search
None
See application file for complete search history.

(56) References Cited

U.S. PATENT DOCUMENTS

| | | |
|---|---|---|
| 4,357,673 A | 11/1982 | Willis et al. |
| 4,458,323 A | 7/1984 | Willis et al. |
| 5,421,008 A | 5/1995 | Banning et al. |
| 5,999,192 A | 12/1999 | Selfridge et al. |

(Continued)

OTHER PUBLICATIONS

Anonymous, "Cursor (databases) Wikipedia, the free encyclopedia," Dec. 2, 2012, XP055222764, Retrieved from the internet: https://en.wikipedia.org/wiki/Cursor_(databases), 7 pgs.

(Continued)

*Primary Examiner* — Thu Nguyet T Le
(74) *Attorney, Agent, or Firm* — Morgan, Lewis & Bockius LLP

(57) ABSTRACT

A method prepares data for subsequent analysis. The method displays a user interface that includes a plurality of panes, including a data flow pane and a data pane. The data flow pane includes a flow diagram having a plurality of nodes, each node specifying a respective primary operation or specifying a plurality of secondary operations to clean a respective data set. The data pane includes a plurality of data values in rows and columns. The data values correspond to a selected node in the data flow pane. A first user input selects a first data value in a first column and receives a second user input to edit a second data value in a second column according to one or more predefined conditions. The method then highlights the second column. When the predefined conditions are met, the method changes the second data value to a replacement data value.

18 Claims, 16 Drawing Sheets

(56) References Cited

U.S. PATENT DOCUMENTS

| | | |
|---|---|---|
| 6,278,452 B1 | 8/2001 | Huberman et al. |
| 6,470,344 B1 | 10/2002 | Kothuri et al. |
| 6,778,873 B1 | 8/2004 | Wang et al. |
| 6,993,553 B2 | 1/2006 | Kaneko et al. |
| 7,362,718 B2 | 4/2008 | Kakivaya et al. |
| 7,720,779 B1 | 5/2010 | Perry et al. |
| 7,793,160 B1 | 9/2010 | McClure et al. |
| 8,418,181 B1 | 4/2013 | Sirota et al. |
| 8,479,136 B2 | 7/2013 | Hopkins et al. |
| 8,626,475 B1 | 1/2014 | Fontes et al. |
| 8,806,377 B2 | 8/2014 | Chen et al. |
| 8,812,752 B1 | 8/2014 | Shih et al. |
| 8,819,592 B2 | 8/2014 | Jackson, Jr. |
| 8,843,959 B2 | 9/2014 | McMaster et al. |
| 8,863,029 B2 | 10/2014 | Chen et al. |
| 9,323,503 B1 | 4/2016 | Fontes et al. |
| 9,465,523 B2 | 10/2016 | Kleser et al. |
| 10,127,511 B1 | 11/2018 | Epstein et al. |
| 10,204,173 B2 | 2/2019 | Vaught |
| 10,242,079 B2 | 3/2019 | Kim et al. |
| 10,275,545 B2 | 4/2019 | Yeager et al. |
| 10,339,681 B2 | 7/2019 | Moore |
| 10,466,978 B1* | 11/2019 | Vidan .................... G06N 20/00 |
| 10,528,587 B2 | 1/2020 | Kim et al. |
| 10,733,165 B1 | 8/2020 | Broad et al. |
| 2002/0070953 A1 | 6/2002 | Barg et al. |
| 2003/0088546 A1* | 5/2003 | Brown ................. G06F 16/248 |
| 2003/0001825 A1 | 9/2003 | Park et al. |
| 2003/0167265 A1 | 9/2003 | Corynen |
| 2003/0220928 A1 | 11/2003 | Durand et al. |
| 2004/0034616 A1 | 2/2004 | Witkowski et al. |
| 2004/0078105 A1 | 4/2004 | Moon et al. |
| 2005/0010877 A1 | 1/2005 | Udler |
| 2005/0022129 A1 | 1/2005 | Borenstein et al. |
| 2005/0044525 A1 | 2/2005 | Lazarov |
| 2006/0143534 A1 | 6/2006 | Dall |
| 2006/0168205 A1 | 7/2006 | Barron et al. |
| 2006/0173812 A1 | 8/2006 | Bahl et al. |
| 2006/0247912 A1 | 11/2006 | Suzuki |
| 2007/0016615 A1 | 1/2007 | Mohan et al. |
| 2007/0150581 A1 | 6/2007 | Banerjee et al. |
| 2007/0198312 A1 | 8/2007 | Bagchi et al. |
| 2007/0214136 A1 | 9/2007 | MacLennan et al. |
| 2007/0288899 A1 | 12/2007 | Fanning et al. |
| 2008/0059563 A1 | 3/2008 | Backmann et al. |
| 2008/0140688 A1 | 6/2008 | Clayton |
| 2008/0155440 A1 | 6/2008 | Trevor et al. |
| 2008/0183687 A1 | 7/2008 | Law |
| 2008/0195626 A1 | 8/2008 | Ukigawa et al. |
| 2008/0209392 A1 | 8/2008 | Able et al. |
| 2008/0254430 A1 | 10/2008 | Woolf et al. |
| 2008/0262988 A1 | 10/2008 | Williams et al. |
| 2008/0281801 A1 | 11/2008 | Larson et al. |
| 2009/0018996 A1 | 1/2009 | Hunt et al. |
| 2009/0021767 A1 | 1/2009 | Fujimaki |
| 2009/0064053 A1 | 3/2009 | Crawford et al. |
| 2009/0100086 A1 | 4/2009 | Dumant et al. |
| 2009/0276724 A1 | 11/2009 | Rosenthal et al. |
| 2009/0319688 A1 | 12/2009 | Mason et al. |
| 2010/0057618 A1 | 3/2010 | Spicer et al. |
| 2010/0156889 A1 | 6/2010 | Martinez et al. |
| 2011/0302551 A1 | 12/2011 | Hummel |
| 2011/0320384 A1 | 12/2011 | Chang |
| 2012/0022707 A1 | 1/2012 | Budhraja et al. |
| 2012/0023302 A1 | 1/2012 | Arndt et al. |
| 2012/0278015 A1 | 1/2012 | Budhraja et al. |
| 2012/0102396 A1 | 4/2012 | Arksey et al. |
| 2012/0151453 A1 | 6/2012 | Finking et al. |
| 2012/0209886 A1 | 8/2012 | Henderson |
| 2012/0226742 A1 | 9/2012 | Monchilov et al. |
| 2013/0042154 A1 | 2/2013 | Agarwa et al. |
| 2013/0080197 A1 | 3/2013 | Kung et al. |
| 2013/0166568 A1 | 6/2013 | Binkert et al. |
| 2013/0212234 A1 | 8/2013 | Bartlett et al. |
| 2013/0283106 A1 | 10/2013 | King et al. |
| 2014/0043325 A1 | 2/2014 | Ruble et al. |
| 2014/0249999 A1 | 9/2014 | Johnson et al. |
| 2014/0250153 A1 | 9/2014 | Nixon et al. |
| 2015/0081701 A1 | 3/2015 | Lerios et al. |
| 2015/0106456 A1 | 4/2015 | van Hoek |
| 2015/0149912 A1 | 5/2015 | Moore |
| 2015/0200867 A1 | 7/2015 | Dutta et al. |
| 2015/0027825 A1 | 10/2015 | Kienzle et al. |
| 2015/0317344 A1 | 11/2015 | Birdwell et al. |
| 2015/0324437 A1 | 11/2015 | Jiang et al. |
| 2015/0378863 A1 | 12/2015 | Balachandran |
| 2015/0378869 A1 | 12/2015 | Balachandran |
| 2016/0062737 A1 | 3/2016 | Stanfill et al. |
| 2016/0070430 A1 | 3/2016 | Kim et al. |
| 2016/0070451 A1 | 3/2016 | Kim et al. |
| 2016/0092476 A1 | 3/2016 | Stojanovic et al. |
| 2016/0260063 A1 | 9/2016 | Harris et al. |
| 2016/0306908 A1 | 10/2016 | Fontes et al. |
| 2016/0364434 A1 | 12/2016 | Spitz et al. |
| 2017/0005674 A1 | 1/2017 | Hussain et al. |
| 2017/0032026 A1 | 2/2017 | Parker et al. |
| 2017/0069118 A1 | 3/2017 | Stewart |
| 2017/0116396 A1 | 4/2017 | Gu et al. |
| 2017/0212944 A1 | 7/2017 | Hellman et al. |
| 2017/0277664 A1 | 9/2017 | Mihalcea et al. |
| 2017/0286264 A1 | 10/2017 | Surmarayana |
| 2017/0315516 A1 | 11/2017 | Kozionov et al. |
| 2018/0129374 A1 | 5/2018 | Kim et al. |
| 2018/0129719 A1 | 5/2018 | Kim et al. |
| 2018/0157579 A1 | 6/2018 | Rozenberg et al. |
| 2018/0165297 A1 | 6/2018 | Kuchoor et al. |
| 2018/0314764 A1 | 11/2018 | Orad et al. |
| 2018/0349251 A1 | 12/2018 | Mietke et al. |
| 2018/0367371 A1 | 12/2018 | Nagarajan et al. |
| 2019/0121807 A1 | 4/2019 | Boutros et al. |
| 2019/0138675 A1 | 5/2019 | Fontes et al. |
| 2019/0179927 A1 | 6/2019 | Rao et al. |
| 2019/0258575 A1 | 8/2019 | Dey et al. |
| 2019/0294421 A1* | 9/2019 | Pietzsch .................... G06F 8/34 |
| 2020/0012656 A1 | 1/2020 | Pugh et al. |

OTHER PUBLICATIONS

Anand, Preinterview First Office Action, U.S. Appl. No. 16/167,313, dated Jan. 24, 2020, 6 pgs.

Anand, Notice of Allowance, U.S. Appl. No. 16/167,313, dated Mar. 2, 2020, 9 pgs.

Anand, Notice of Allowance, U.S. Appl. No. 16/908,700, dated Mar. 11, 2021, 10 pgs.

Bae, J., Understanding Indirect Casual Relationships in Node-Link Graphs, Eurographics Conference on Visualization (Euro Vis) Jun. 2017, vol. 36, No. 3, 22 pgs.

Disclosed Anonymously, IP COM Method to enter data while filter applied, Dec. 6, 2011, (YearL 2011), 7 pgs.

Cole, Office-Action, U.S. Appl. No. 15/726,294, dated Nov. 9, 2018, 40 pgs.

Cole, Notice of Allowance, U.S. Appl. No. 15/726,294, dated May 15, 2019, 14 pgs.

Ghani, S., Perception of Animated Node-Link Diagrams Graphs, Eurographics Conference on Visualization, (Euro Vis) Jun. 2012, vol. 31, No. 3, 11 pgs.

Ishio et al., "A Lightweight Visualization of Interprocedural Data-Flow Paths for Source Code Reading," [Online], 2012, pp. 37-46, retrieved from internet on May 7, 2019, <https://ieeexplore.org/stampjsp?tp=&arnumber=6240506> (Year: 2012).

Kabbaj et al., "Towards an Active Help on Detecting Data Flow Errors in Business Process Models," [Online}, 2015, pp. 16-25, [retrieved from internet on Jul. 11, 2020] <https://www.researchgate.net/profile/Mohammed_Isaam_Kabbaj/publication/263966796_Toward_an_active_help_on_detecting_data_flow_errors> (Year:2015), 11 pgs.

Kim, Office Action, U.S. Appl. No. 15/345,391, dated Jun. 28, 2019, 10 pgs.

Kim, Office Action, U.S. Appl. No. 15/345,391, dated Feb. 13, 2020, 16 pgs.

(56) References Cited

OTHER PUBLICATIONS

Kim, Final Office Action, U.S. Appl. No. 15/345,391, dated Sep. 17, 2020, 16 pgs.
Kim, Office Action, U.S. Appl. No. 15/345,391, dated Jun. 8, 2021, 14 pgs.
Kim, Pre-Interview First Office Action—U.S. Appl. No. 15/701,392, dated Mar. 9, 2020, 5 pgs.
Kim, Final Office Action—U.S. Appl. No. 15/701,392, dated Sep. 21, 2020, 18 pgs.
Kim, Notice of Allowance, U.S. Appl. No. 15/701,392, dated Apr. 20, 2021, 9 pgs.
Kim, Notice of Allowance, U.S. Appl. No. 15/705,174, dated Sep. 24, 2019, 10 pgs.
Kim, Notice of Allowance, U.S. Appl. No. 16/153,615, dated Jul. 14, 2020, 10 pgs.
Kim, Notice of Allowance, U.S. Appl. No. 16/285,084, dated Apr. 6, 2020, 9 pgs.
Kim, Notice of Allowance, U.S. Appl. No. 16/537,444, dated Jul. 22, 2020, 14 pgs.
Kim, Notice of Allowance, U.S. Appl. No. 16/138,705, dated Aug. 7, 2020, 9 pgs.
Kim, Notice of Allowance, U.S. Appl. No. 15/701,381, dated Nov. 9, 2018, 6 pgs.
Pugh, Notice of Allowance, U.S. Appl. No. 16/155,818, dated Oct. 1, 2020, 9 pgs.
Pugh, Notice of Allowance, U.S. Appl. No. 17/142,138, dated Aug. 5, 2021, 9 pgs.
Wildenradt, Notice of Allowance, U.S. Appl. No. 16/681,753, dated May 6, 2021, 10 pgs.
Logothetis et al., "Scalable Lineage Capture for Debugging DISC Analytics," [Online], 2013, pp. 1-15, retrieved from internet on May 7, 2019, <http://delivery.acm.org/10.1145/250000/252369/a17-logothetis.pdf> (Year:2013).
Lovat et al., "On Quantitative Dynamic Data Flow Tracking," [Online], 2014, pp. 211-222, [retrieved from internet on Jul. 11, 2020, <https://dl,acm/doi/pdf/10.11145/2557547.2557551> (Year: 2014), 12 pgs.
Meda et al., "On Detecting Data Flow Errors in Workflows," [Online] 2010, pp. 4:1-4:31, [retrieved from internet on Jul. 11, 2020], <https://dl.acm.org/doi/pdf/10.1145/1805286.1805290> (Year: 2020), 31 pgs.
Moser et al., "Advanced Verification of Distributed WS-BPEL Business Processes Incorporating CSSA-based Data Flow Analysis," [Online], 2007, pp. 1-8, [retrieved from internet on Jul. 11, 2020], <https://ieeexplore.ieee.org/stamp/stamp.jsp?tp=&arnumber=4278643> (Year: 2007), 8 pgs.
Tableau Software, Inc., International Search Report and Written Opinion, PCT/US2017/060232, dated Jan. 18, 2018, 10 pgs.
Tableau Software, Inc., International Search Report and Written Opinion, PCT/US2019/053935, dated Dec. 18, 2019, 13 pgs.
Tableau Software, Inc., Communication Pursuant Rules 161(1) and 162, EP17801216.7, dated Jun. 17, 2019, 3 pgs.
Tableau Software, Inc., Communication Pursuant to Article 94(3), EP17801216.7, dated Apr. 3, 2020, 6 pgs.
Tibco, "TIBCO ActiveMatrix BusinessWorks™ Process Design Software Release 5.13," Aug. 31, 2015, retrieved from the Internet: URL:https://docs.tibco.com/pub/activematrix_businessworks/5.13.0/doc/pdf/tib_bw_process_design_guide.pdf, 107 pgs.
Yip et al., "Improving Application Security with Data Flow Assertions," [Online], 2009, pp. 1-18, retrieved from internet on May 7, 2019, <http://www.sigops.org/conferences/sosp/2009/papers/yip-sosp09.pdf> (Year:2009).

\* cited by examiner

DATA PREPARATION USER INTERFACE WITH CONDITIONAL REMAPPING OF DATA VALUES

CROSS REFERENCE TO RELATED APPLICATIONS

This application claims priority to U.S. Provisional Application Ser. No. 62/748,995, filed Oct. 22, 2018, entitled "Data Preparation User Interface with Conditional Remapping of Data Values," which is incorporated by reference herein in its entirety.

This application is related to U.S. patent application Ser. No. 15/345,391, filed Nov. 7, 2016, U.S. patent application Ser. No. 15/701,381, filed Sep. 11, 2017, U.S. patent application Ser. No. 15/701,392, filed Sep. 11, 2017, U.S. patent application Ser. No. 15/705,174, filed Sep. 14, 2017, U.S. patent application Ser. No. 16/138,705, filed Sep. 21, 2018, U.S. patent application Ser. No. 16/153,615, filed Oct. 5, 2018, and U.S. patent application Ser. No. 16/155,818, filed Oct. 9, 2018, each of which is incorporated by reference herein in its entirety.

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to be manipulated or massaged to put it into a format that can be easily used by data visualization applications.

SUMMARY

Disclosed implementations provide methods to conditionally group and replace data values in a data set, which can be used as part of a data preparation application.

In accordance with some implementations, a method prepares data for subsequent analysis. The method includes displaying a user interface that includes a plurality of panes, including a data flow pane and a data pane. The data flow pane includes a flow diagram having a plurality of nodes. Each node specifies a respective primary operation or specifies a plurality of secondary operations to clean a respective data set. The data pane includes a plurality of data values in a plurality of rows and a plurality of columns. The plurality of data values corresponds to a selected node in the data flow pane.

In accordance with some implementations, the method proceeds by receiving a first user input to select a first data value in a first column. The method continues with receiving a second user input to edit a second data value in a second column in accordance with one or more predefined conditions.

In response to receiving the second user input, the method highlights the second column. When the one or more predefined conditions have been met, the method changes the second data value to a replacement data value.

In some instances, the one or more predefined conditions are based on the first data value.

In some instances, the one or more predefined conditions are based on one or more data values.

In accordance with some implementations, in response to receiving a third user input and in accordance with a determination that the one or more predefined conditions have been met, the method changes a third data value in the second column to the replacement data value, where the third data value is equivalent to the second data value.

In accordance with some implementations, each node has a primary data set computed according to the primary operation. When the primary operation is selected in a change list pane, a sampling of data from the primary data set is displayed.

In some implementations, a computer system has one or more processors, memory, and a display. The one or more programs include instructions for performing any of the methods described herein.

In some implementations, a non-transitory computer readable storage medium stores one or more programs configured for execution by a computer system having one or more processors, memory, and a display. The one or more programs include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
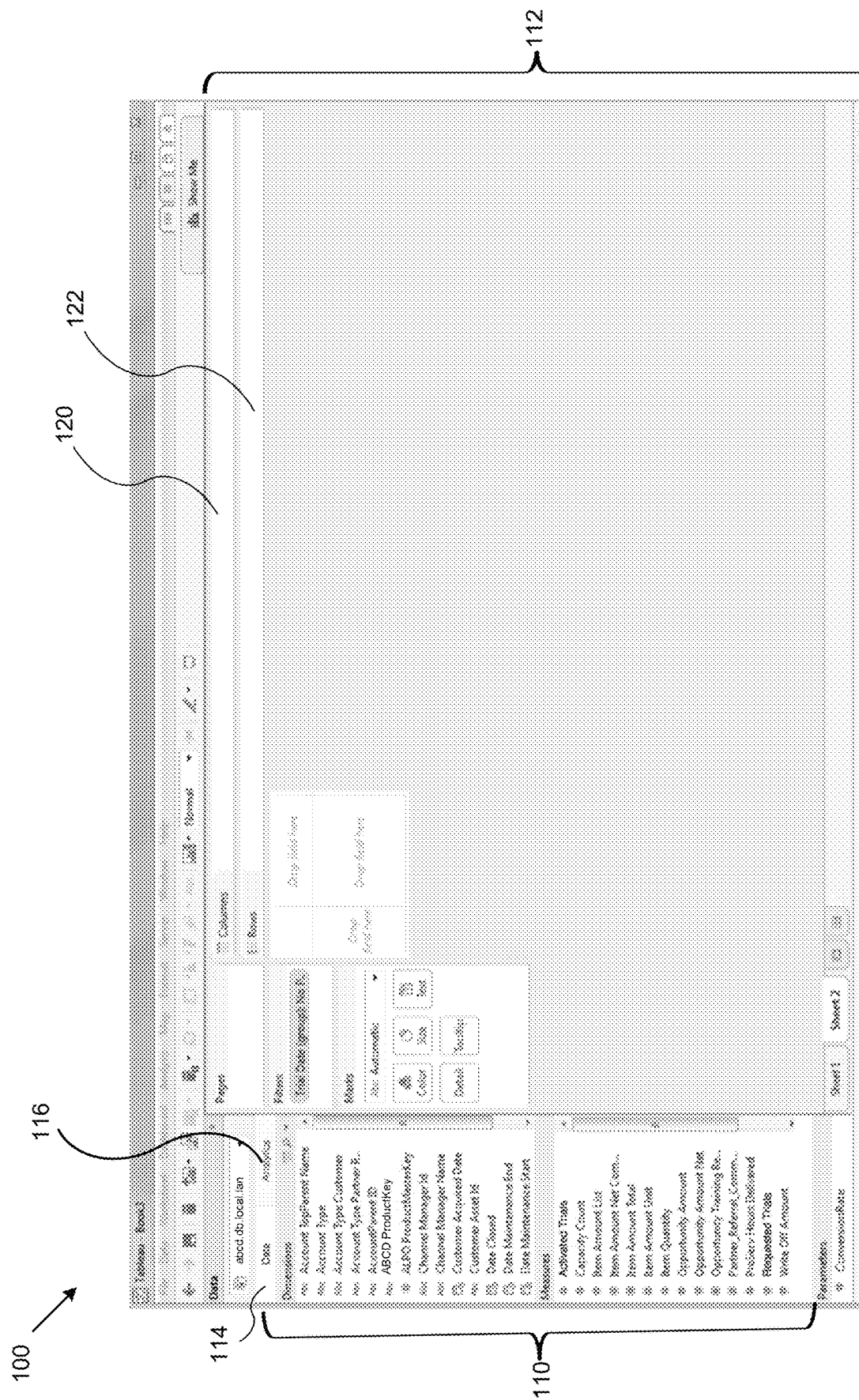
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
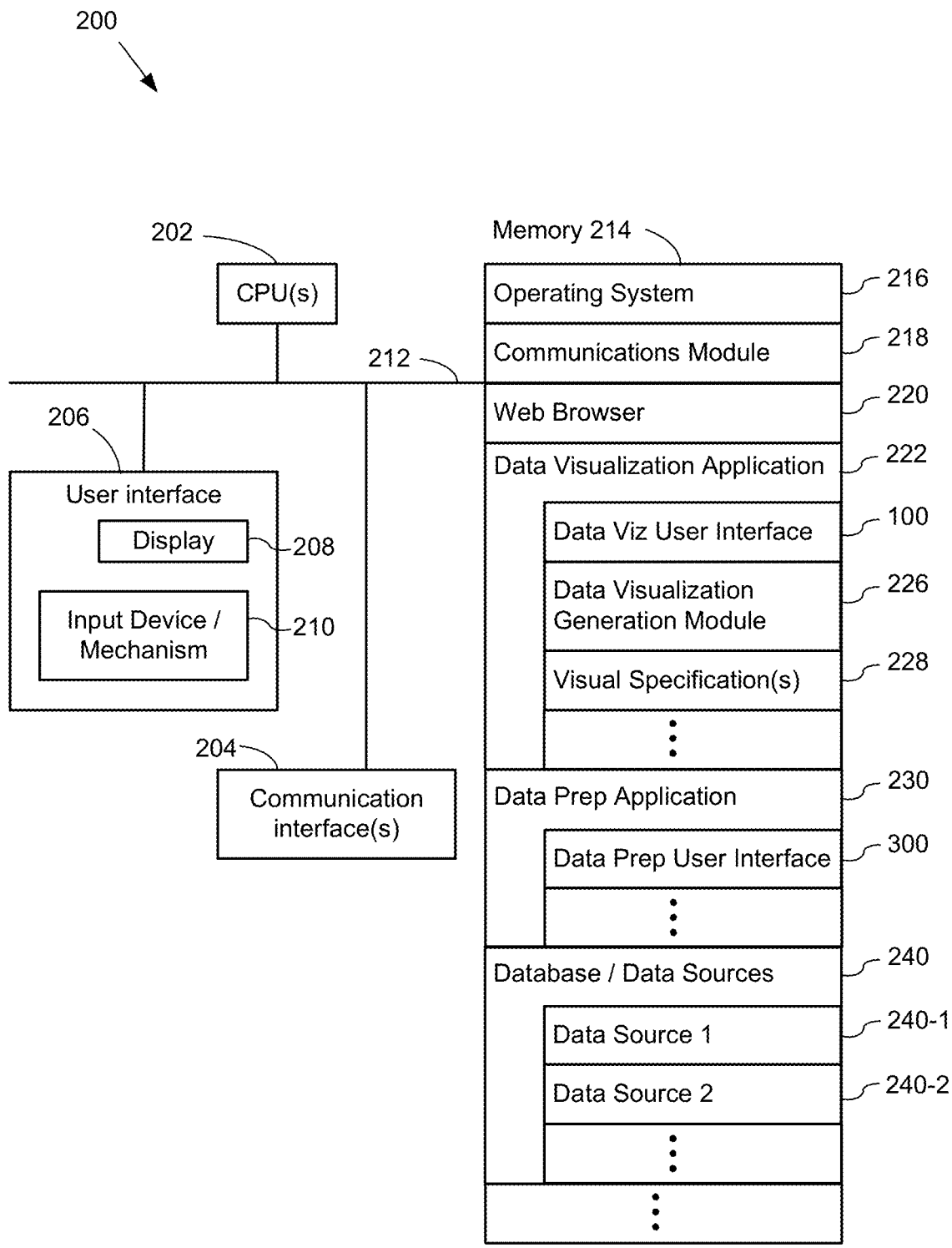
FIG. 2 is a block diagram of a computing device in accordance with some implementations.

FIG. 2 is a block diagram illustrating a computing device 200 that can display the graphical user interface 100 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database.

In some instances, the computing device 200 stores a data prep application 230, which can be used to analyze and massage data for subsequent analysis (e.g., by a data visualization application 222). FIG. 3B illustrates one example of a data prep user interface 300. The data prep application 230 enables user to build flows 323, as described in more detail below.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
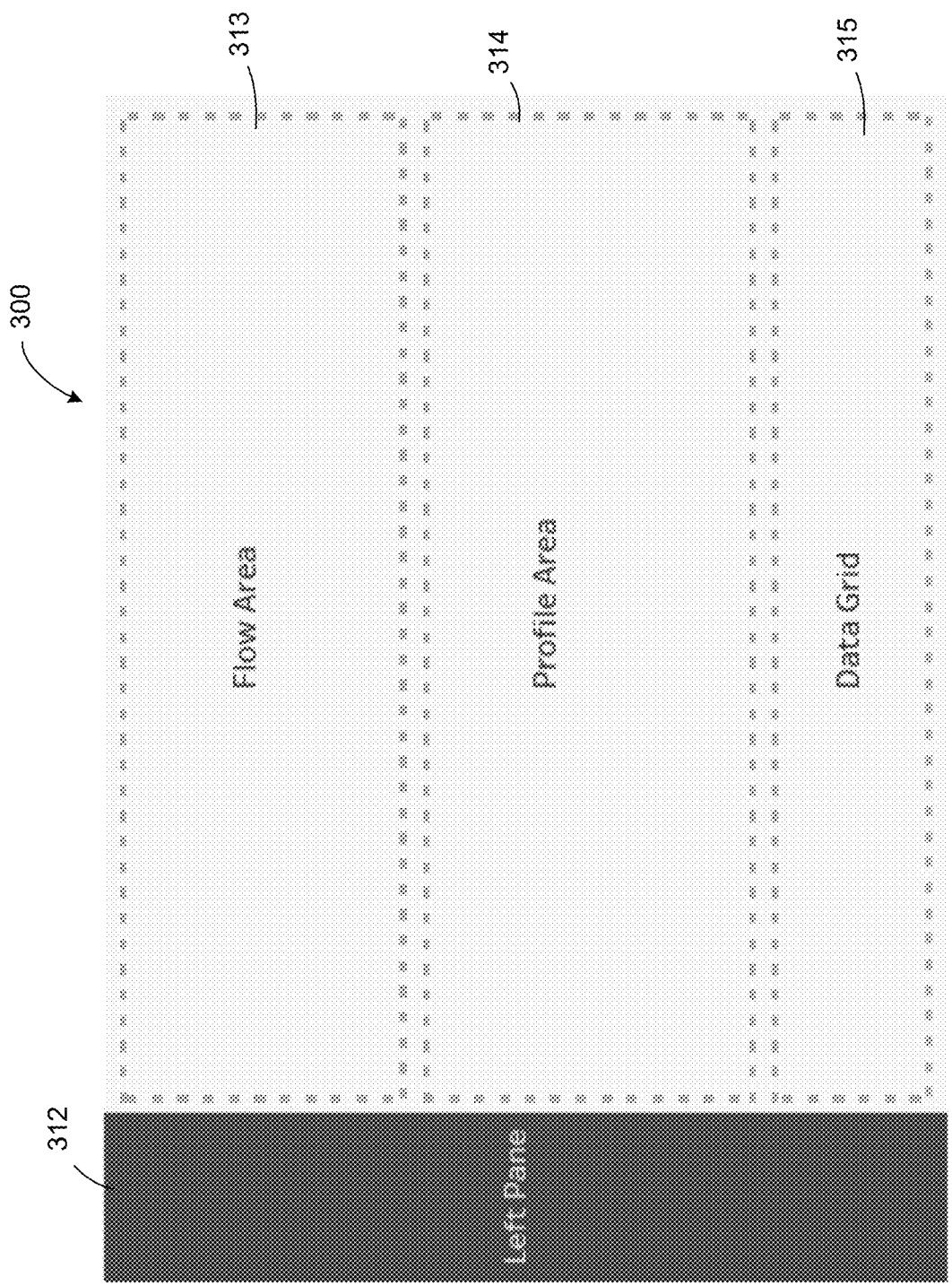
FIGS. 3A and 3B illustrate user interfaces for a data preparation application in accordance with some implementations.
Figure 3B:
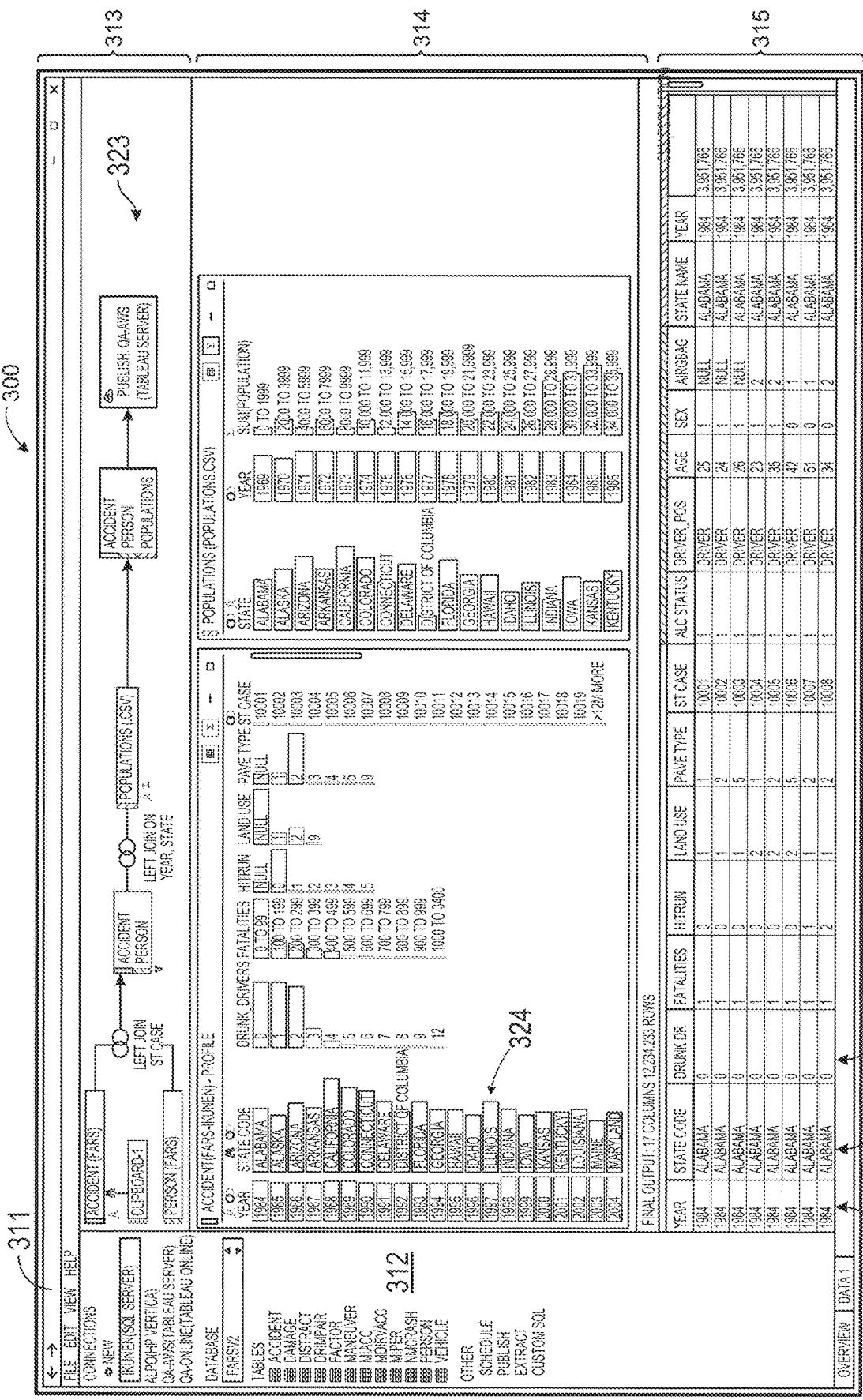

FIGS. 3A and 3B illustrate a user interface for preparing data in accordance with some implementations. In these implementations, there are at least four regions of the user interface. Each of these regions has distinct functionality. FIG. 3A shows this conceptually as a left-hand pane 312, a flow pane 313, profile pane 314, and a data pane 315. In some implementations, the profile pane 314 is also referred to as the schema pane. In some implementations, the functionality of the "left-hand pane" 312 is in an alternate location, such as below the menu pane 311 or below the data pane 315. In some implementations, one of the panes in the user interface comprises two or more panels, with each panel representing or illustrating one or more functions, one or more data sets, or one or more lists. In some implementations more than one pane of the user interface comprises two or more panels, with each panel representing or illustrating one or more functions, one or more data sets, or one or more lists.

FIG. 3A illustrates an overview of a user interface 300 for data preparation, showing panes that group together different functionality. In some implementations, the left-hand pane 312 provides options for a user to locate and connect to data or to perform operations on already selected data. In some implementations the flow area 313 illustrates one or more operations at nodes to perform on selected data (e.g., data manipulations to prepare data for analysis). In some implementations the profile area 314 provides information about the data set at the currently selected node. In some implementations, the data grid 315 provides raw data values in rows and columns of the data set at the currently selected node in the flow area 313.

FIG. 3B provides a concrete example of a user interface 300 for data preparation, showing the user interface elements in each of the panes. The menu bar 311 includes one or more menus, such as a File menu and an Edit menu. Although the edit menu is available, more changes to the flow are performed by interacting with the flow pane 313, the profile pane 314, or the data pane 315.

In some implementations, the left-hand pane 312 includes a data source palette/selector. The left-hand pane 312 also includes an operations palette, which displays operations that can be placed into the flow. In some implementations, the list of primary operations includes reshaping operations such as arbitrary joins (of arbitrary type and with various predicates), union, pivot, aggregate. In some implementations the primary operation comprises inputting or outputting. In some implementations, the list of secondary operations includes renaming and restricting columns, projecting, scalar calculations, filtering, data type conversion, data parse, coalesce, merge, split, value replacement, and sampling. Some implementations also support operators to create sets (e.g., partition the data values for a data field into sets), binning (e.g., grouping numeric data values for a data field into a set of ranges), and table calculations (e.g., calculating data values, such as percent of total, for each row, which depends not only on the data values in each row, but also on other data values in the table).

In some implementations, the left-hand pane 312 also includes a palette of other flows that can be incorporated in whole or in part into the current flow. This enables a user to reuse components of a flow to create new flows. For example, if a portion of a flow has been created that scrubs a certain type of input using a combination of 10 steps, that 10 step flow portion can be saved and reused, either in the same flow or in completely separate flows.

The flow pane 313 displays a visual representation (e.g., node/link flow diagram) 323 for the current flow. The Flow Pane 313 provides an overview of the flow, which serves to document the process. As the number of nodes increases, implementations typically add scroll bars. The need for scroll bars is reduced by coalescing multiple related nodes into super nodes, which are also called container nodes. This enables a user to see the entire flow more conceptually, and allows a user to dig into the details only when necessary. In some implementations, when a "super node" is expanded, the flow pane 313 shows just the nodes within the super node, and the flow pane 313 has a heading that identifies what portion of the flow is being displayed. Implementations typically enable multiple hierarchical levels.

The profile pane 314 provides a quick way for users to figure out if the results of the one or more transforms are what they expect them to be. The profile pane provides distribution data for the data values in the currently selected data set (corresponding to the selected node in the flow pane 313). The distributions are typically displayed as histograms of individual data values or value ranges, such as the bar 324 for the data value "ILLINOIS" in the column for the data field "STATE CODE". Outliers and incorrect values typically "pop out" visually based on comparisons with both other values in the node or based on comparisons of values in other nodes. The profile pane helps users ferret out data problems, regardless of whether the problems are caused by incorrect transforms or dirty data. In addition to helping users find the bad data, the profile pane also allows direct interactions to fix the discovered problems. In some implementations, the profile pane 314 updates asynchronously. When a node is selected in the flow pane, the user interface starts populating partial values (e.g., data value distribution histograms) that get better as time goes on. In some implementations, the profile pane includes an indicator to alert the user whether it is complete or not. With very large data sets, some implementations build a profile based on sample data only.

Within the profile pane 314, a user can perform various tasks, including:
  Investigating data ranges and correlations. Users can use the profile pane 314 to focus on certain data or column relationships using direct navigation.
  Filtering in/out data or ranges of data. Users can add filter operations to the flow 323 through direct interactions. This results in creating new nodes in the flow pane 313.
  Transforming data. Users can directly interact with the profile pane 314 in order to map values from one range to another value. This creates new nodes in the flow pane 313.

The data pane 315 provides a way for users to see and modify rows that result from the flows. The data is displayed as a grid with a plurality of rows and a plurality of columns, such as the columns 326. Typically, the data pane selects a sampling of rows corresponding to the selected node (e.g., a sample of 10, 50, or 100 rows rather than a million rows). In some implementations, the rows are sampled in order to display a variety of features. In some implementations, the rows are sampled statistically, such as every nth row.

The data pane 315 is typically where a user cleans up data (e.g., when the source data is not clean). Like the profile pane, the data pane updates asynchronously. When a node is first selected, rows in the data pane 315 start appearing, and the sampling gets better as time goes on. Most data sets will only have a subset of the data available here (unless the data set is small).

Within the data pane 315, a user can perform various tasks, including:

- Sort for navigation. A user can sort the data in the data pane based on a column, which has no effect on the flow. The purpose is to assist in navigating the data in the data pane.
- Filter for navigation. A user can filter the data that is in the view, which does not add a filter to the flow.
- Add a filter to the flow. A user can also create a filter that applies to the flow. For example, a user can select an individual data value for a specific data field, then take action to filter the data according to that value (e.g., exclude that value or include only that value). In this case, the user interaction creates a new node in the data flow 323. Some implementations enable a user to select multiple data values in a single column, and then build a filter based on the set of selected values (e.g., exclude the set or limit to just that set).
- Modify row data. A user can directly modify a row. For example, change a data value for a specific field in a specific row from 3 to 4.
- Map one value to another. A user can modify a data value for a specific column, and propagate that change to all of the rows that have that value for the specific column. For example, replace "N.Y." with "NY" for an entire column that represents states.
- Split columns. For example, if a user sees that dates have been formatted like "14-Nov.-2015", the user can split this field into three separate fields for day, month, and year.
- Merge columns. A user can merge two or more columns to create a single combined column.

A node-specific pane displays information that is particular to a selected node in the flow. Because a node specific pane is not needed most of the time, the user interface typically does not designate a region within the user interface that is solely for this use. Instead, a node specific pane is displayed as needed, sometimes using a popup that floats over other regions of the user interface. For example, some implementations use a node specific pane to provide specific user interfaces for joins, unions, pivoting, unpivoting, running Python scripts, parsing log files, or transforming a JSON objects into tabular form.

The Data Source Palette/Chooser enables a user to bring in data from various data sources. In some implementations, the data source palette/chooser is in the left-hand pane 312. A user can perform various tasks with the data source palette/chooser, including:

- Establish a data source connection. This enables a user to pull in data from a data source, which can be an SQL database, a data file such as a CSV or spreadsheet, a non-relational database, a web service, or other data source.
- Set connection properties. A user can specify credentials and other properties needed to connect to data sources. For some data sources, the properties include selection of specific data (e.g., a specific table in a database or a specific sheet from a workbook file).

Figure 5A:
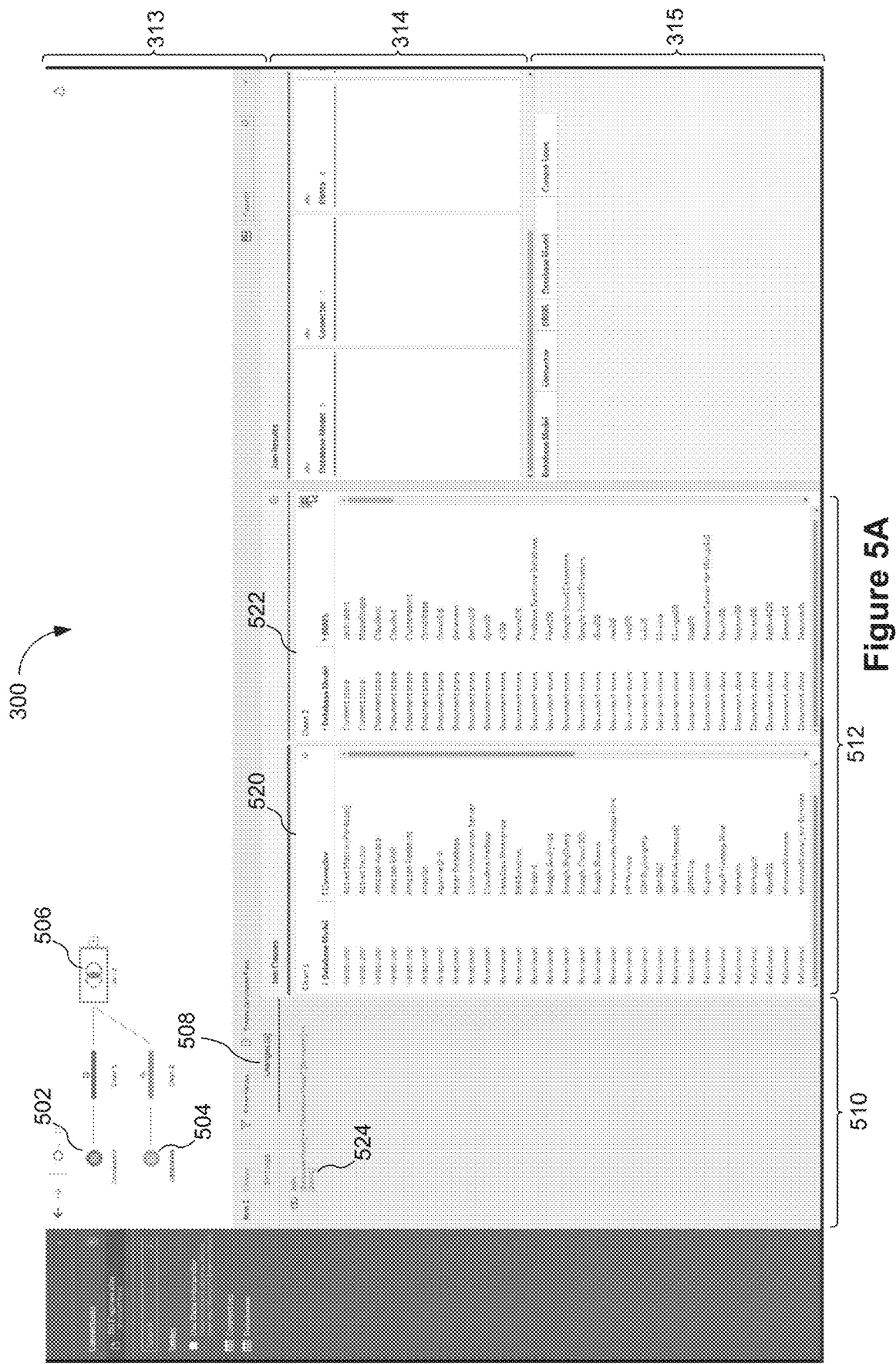
FIGS. 5A-5J collectively illustrate a user interface providing for conditional group and replace operations in accordance with some implementations.

FIG. 5A illustrates a data prep user interface 300 providing for conditional group and replace functionalities, with a flow pane 313, a profile pane 314, and a data pane 315. In some implementations, one or more existing nodes (e.g., 502) are present in the flow pane 313. When an existing node is selected, a plurality of data values associated with the selected node are displayed in the data pane 315. In some implementations, each node has a primary data set computed according to the primary operation. In some implementations, when a user adds a new node a new intermediate data set is computed, or initialized as a copy of the data set of the next most recent node in the data flow pane 313. In some implementations, one or more additional panes are included.

In some implementations, the profile and data panes are reorganized depending on the selected node, and one or more new panes (e.g., panes 510 and 512) are displayed, enabling users to manage and coordinate operations. In some implementations, an additional panel 512 provides for display of two data sets 520 and 522 used in a join operation. For example, in FIG. 5A, the intermediate data sets 520 and 522 display the two input data sets for the join node 506, coming from the Connectors data source 502 and the Databases data source 504. In some implementations, the Changes tab 508 in the left pane 510 displays actions that a user has taken in the data flow pane 313 or in regards to the selected node (e.g., in FIG. 5A, the join event 524 is listed in the changes tab 508). In some implementations, the profile pane 314 displays the results of the primary operation (e.g., the join operation) of the selected node 506.

In some instances, no results (or a small number of results) are displayed initially because the join did not behave as expected. For example, this can be caused by mismatched values in the intermediate data sets 520 and 522. In some implementations, the system highlights these mismatched values to indicate to the user that some manual data cleaning or modifications are necessary in order to complete the primary operation in the new node.

Figure 5B:
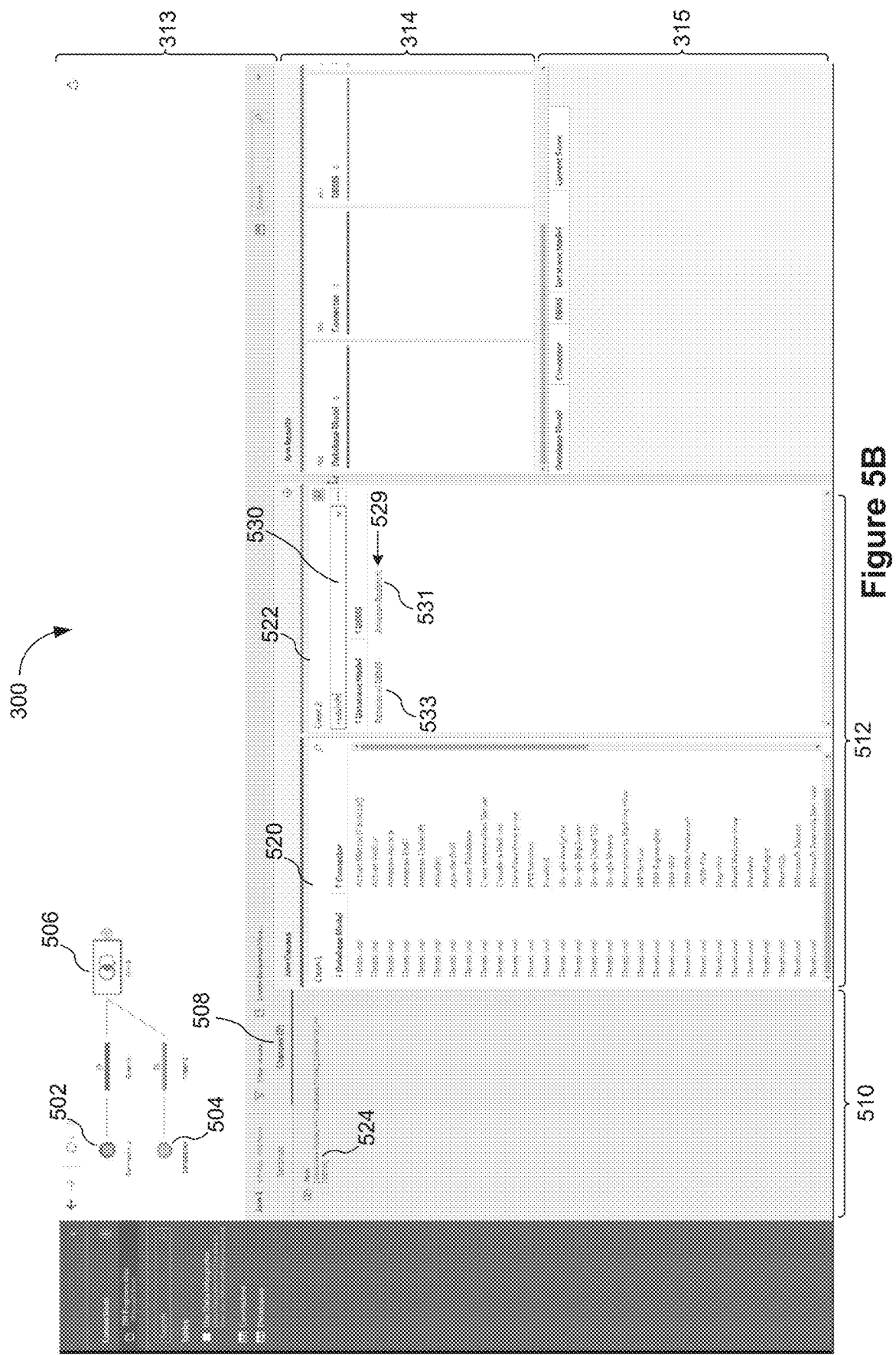

FIG. 5B displays the user searching in the search bar 530 for the particular value "redshift" in the second data set 522. The search finds the data value "Amazon Redshift" 531 in one row 529 of the second data set. This data value 531 is in the data column "DBMS." For the one row 529 in the result set, the data value 533 for the column "Database Model" is the value "Relational DBMS" 533. This data value 533 explains why the join at the join node 506 did not work as expected (i.e., no join results, as illustrated by the lack of data in the profile pane 314 and the data pane 315). That is, for the data field "Database Model" from the "Databases" node 504, the value is "Relational DBMS," whereas for the data field "Database Model" from the "Connectors" node 502, the value is "Relational" without the "DBMS" suffix. Intuitively, "Relational DBMS" and "Relational" match, but they are not a literal match that the computer found for the join operation at the join node 506. Subsequent figures illustrate how to clean up the data so that the data does match.

Figure 5C:
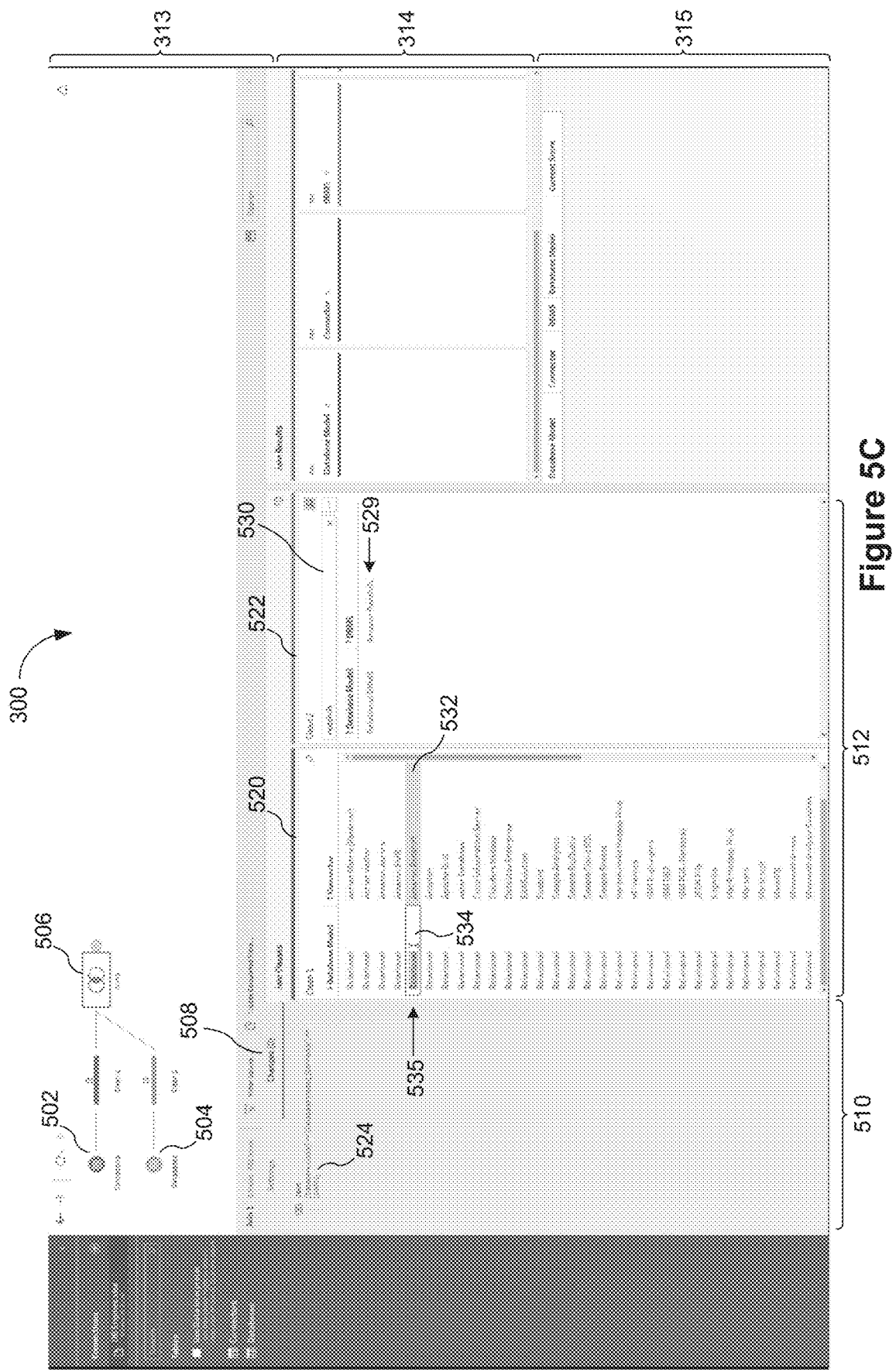

In FIG. 5C, the user can see the row 529 in the second data set (e.g., the values shown in the second panel 522, which come from the Databases node 504) that matches the search value "redshift." The user can then look for values in the first data set that correspond to either "Relational DBMS" or "Amazon Redshift." The user sees the value "Amazon Redshift" 532 in a row 535 in the first data set, and knows that this row 535 should join to the one row 529 in the second data set.

Figure 5D:

In order to facilitate the join operation 524 between data sets 520 and 522, the user must coordinate the category values. In the example shown in FIGS. 5C-5D, the edits the row 535 to change the category value 534 ("Relational") to the category value 536 ("Relational DBMS"). With this change, the "Database Model" column for the row 535 in the first data set matches the "Database Model" column for the one row 529 in the second data set.

Figure 5E:
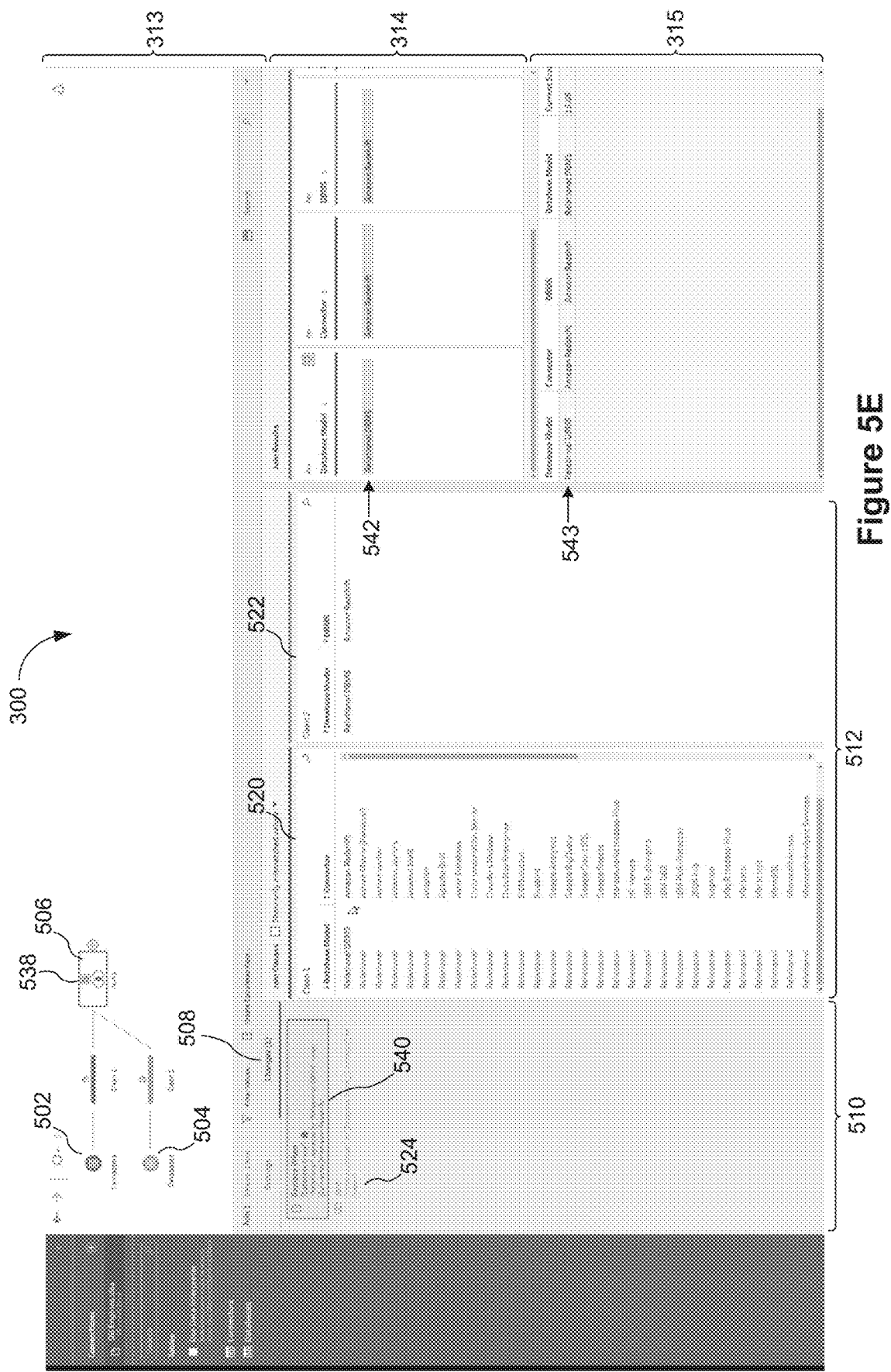

The manual mapping that the user performed in FIGS. 5A-5D, is then converted into a rule that is propagated throughout the rest of the data set. For example, FIG. 5E displays a new "Replace When" secondary cleaning operation 540 in the change panel 508. This secondary cleaning operation provides for replacing all "Relational" values with "Relational DBMS" in conditions where the connector value is "Amazon Redshift." In this case, when the connector value is anything other than "Amazon Redshift," the "Replace When" secondary cleaning operation 540 is not performed and no values are changed.

Because the data for one row was fixed, profile pane 314 now displays the matched row 542 and the data pane 315 also shows a single matched row 543.

In some implementations, a new icon 538 is displayed in the flow pane upon showing the addition of a cleaning operation. In some implementations, the new icon 538 is displayed associated with the active or selected node 506. In some implementations, the new icon 538 is displayed above the active or selected node 506. In some implementations, there is no indication associated with the addition of a secondary cleaning operation displayed in the flow pane 313. In some implementations, the icon 538 is an affordance that, upon receiving a user input, displays the change list (e.g., a list of cleaning operations) performed at the associated node.

Figure 5F:
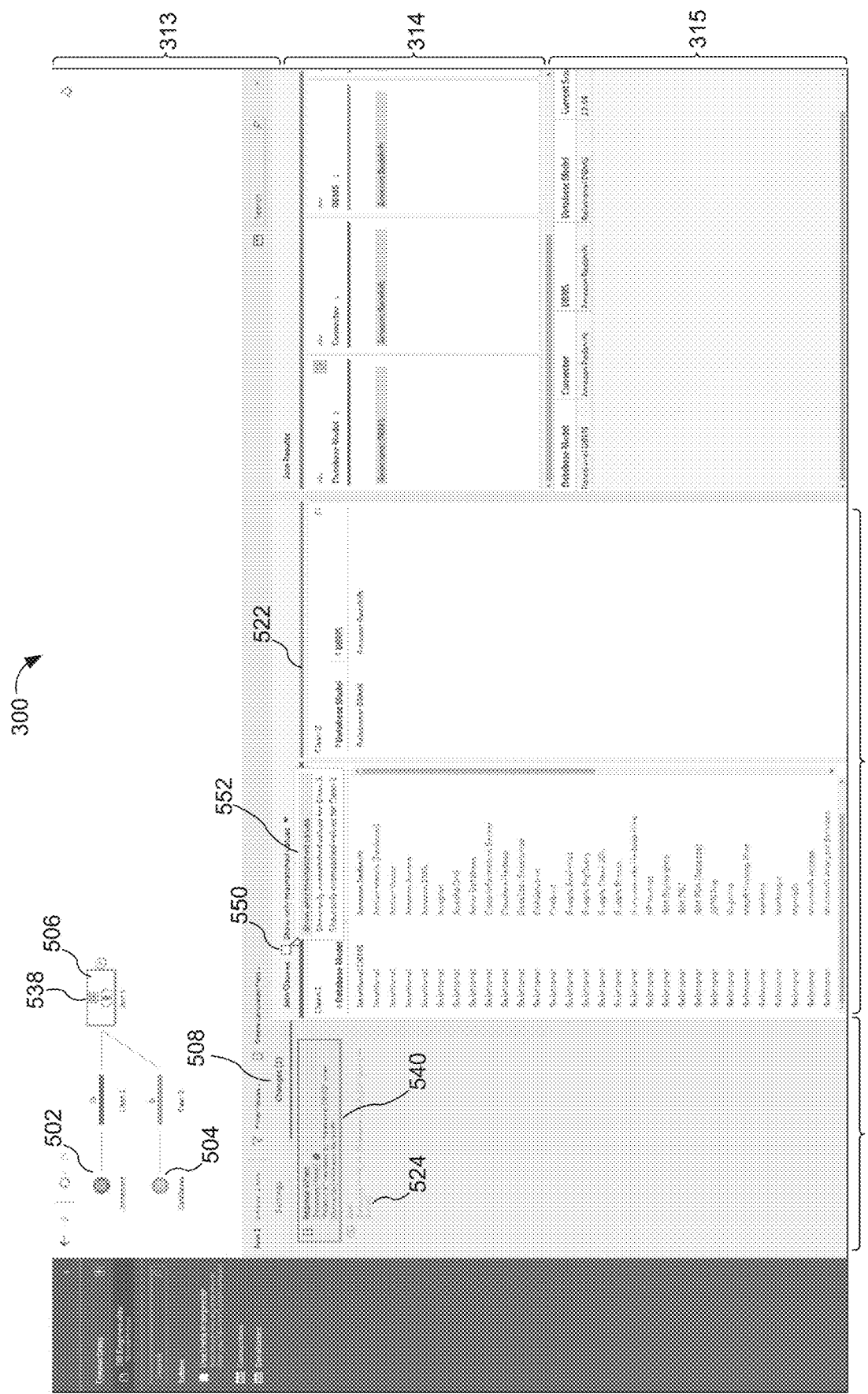
Figure 5G:
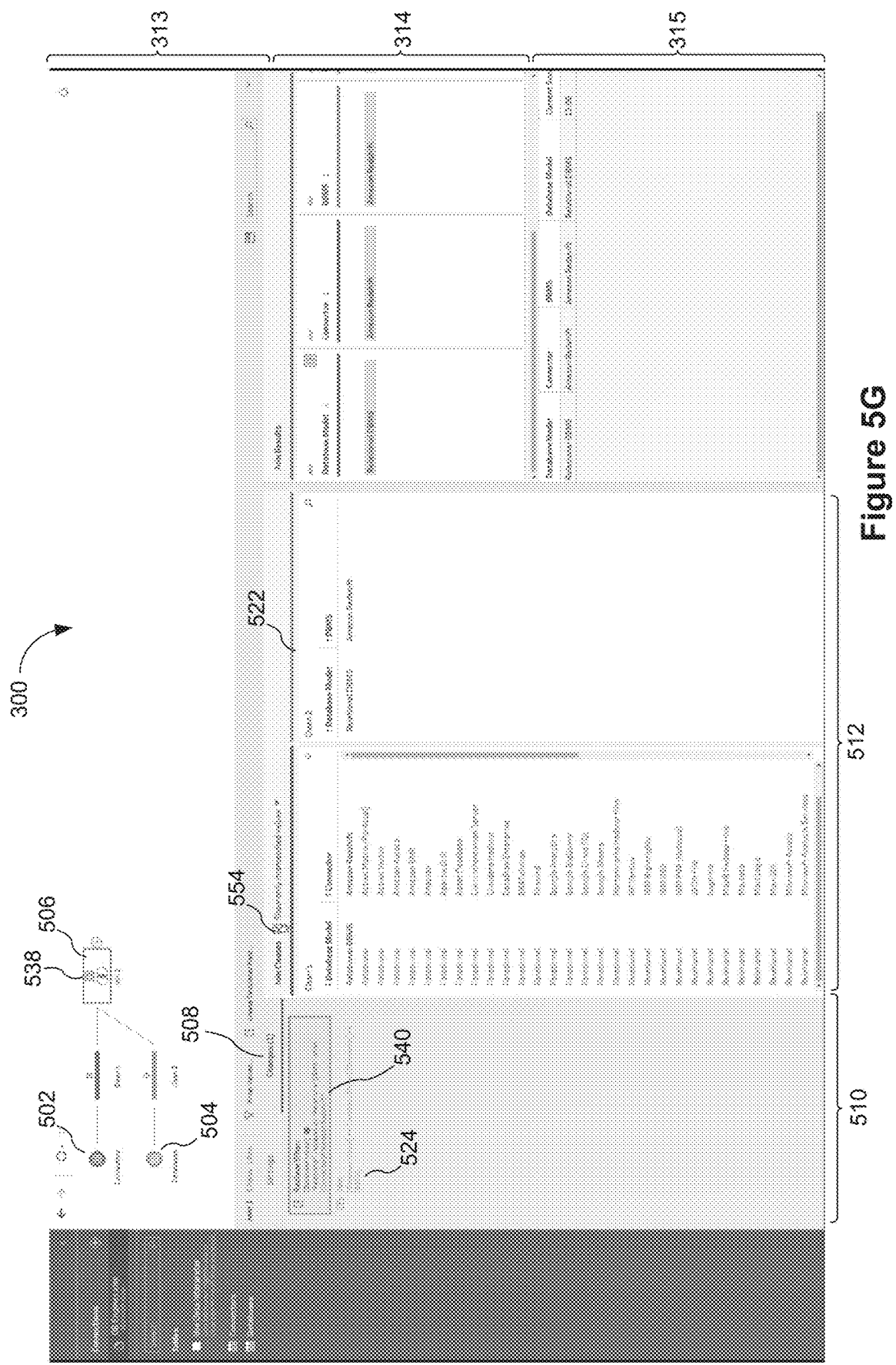

As shown in FIGS. 5F and 5G, in some implementations, a mismatch affordance 550 is provided. When a user selects the mismatch affordance 550, the interface 300 displays mismatch options 552. This enables the user to see one or more subsets of the mismatches that resulted from the primary operation of the selected node 506. When selected, the panels 520 and/or 522 display only rows that are not matched to rows in the other panel. A checkbox 554 indicates when one of the options has been selected.

Figure 5H:
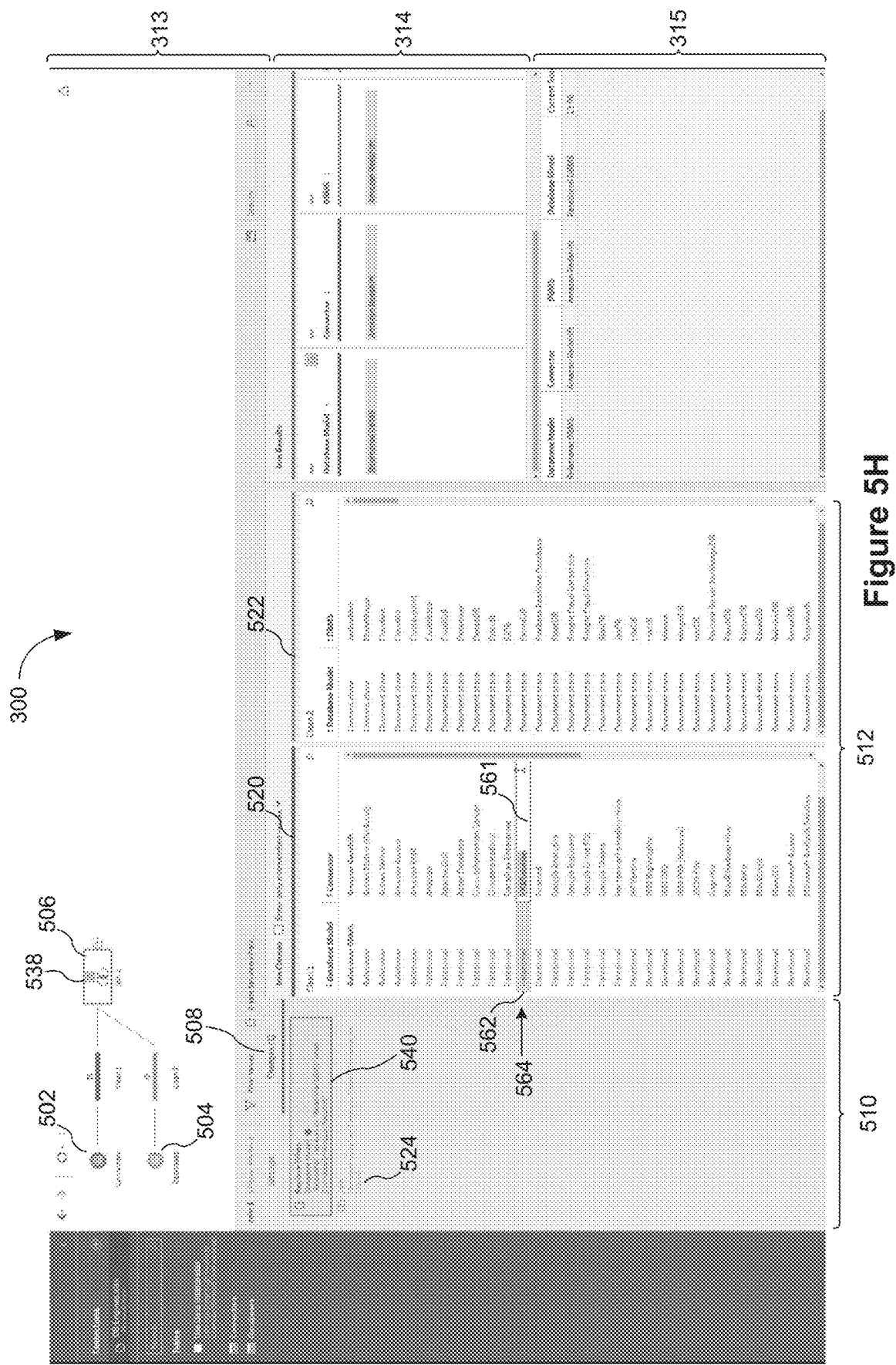
Figure 5I:
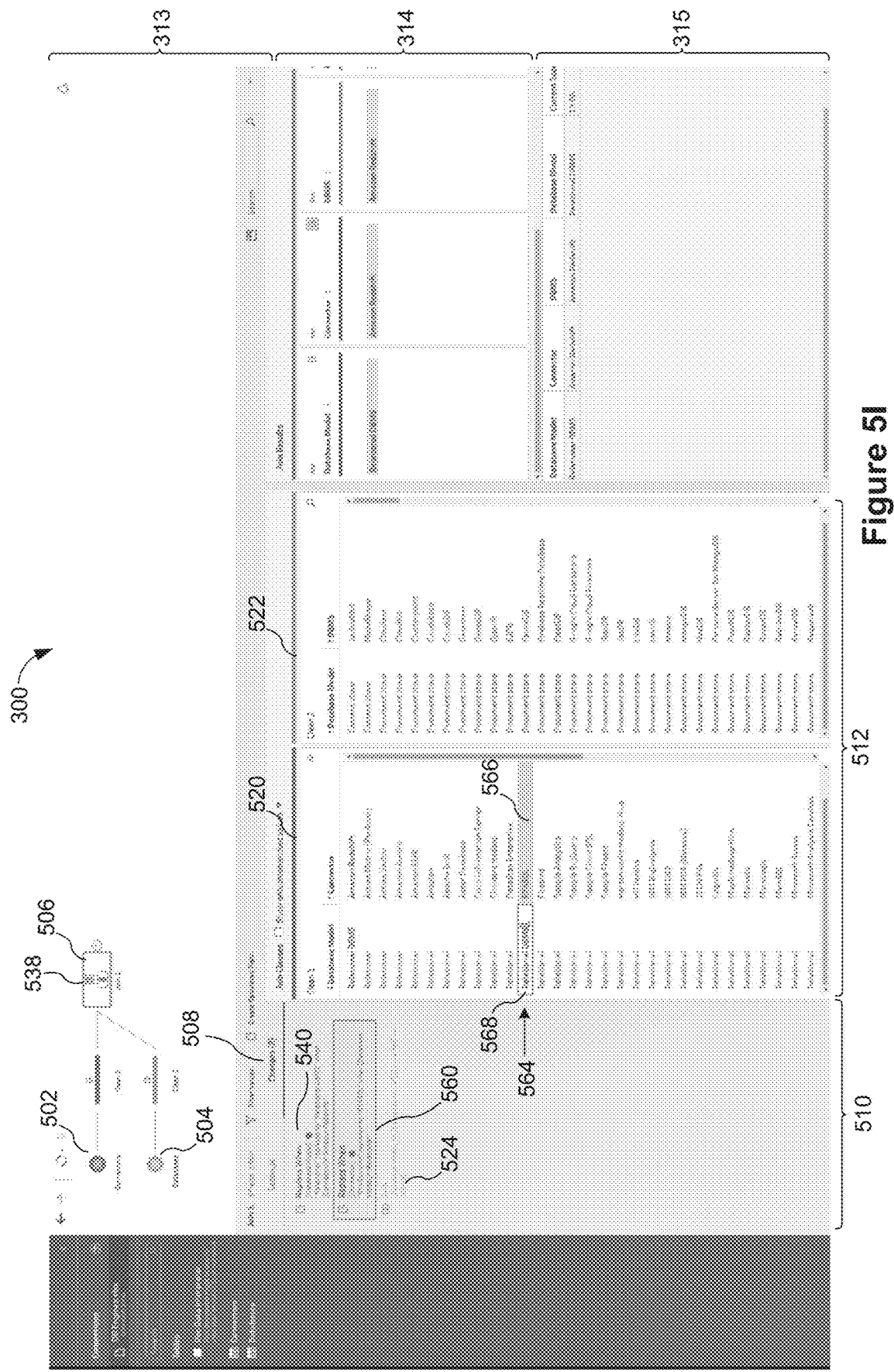
Figure 5J:

FIGS. 5H-5J illustrate an example of performing an additional secondary cleaning operation at a selected node. As shown in FIG. 5H, the user has selected the data value "EXASolution" 561 in another row 564 in the first data set. The user edits the value "EXASolution" 561, replacing it with the replacement value "EXASOL" 566, as illustrated in FIG. 5I. This results in adding a new cleaning operation 560 (another conditional remap operation) to the Changes list 508 in the left pane 510. The user also manually edits the data value "Relational" 562 for this row 564, changing it to a replacement value "Relational DBMS" 568. This results in adding yet another cleaning operation 580 to the Changes list 508, as illustrated in FIG. 5J. These edits to the row 564 creates one more match for the join operation, so the profile pane 314 shows an additional row 582 and the data pane 315 shows an additional row 583 as well.

In some implementations, the cleaning operations 540, 560, and 580 are ordered in the Changes list 508 in the left pane 508 in chronological order (the order in which they were created). In some instances, the order is not chronological if the user manually changes the order or when there is a data dependency that requires an alternative order.

With the conditional remapping operations described in reference to FIG. 5A-5J, users are provided with an easy mechanism for curating data sets with mismatched values. Improper matching is a significant problem in data analysis, impeding certain transformations and combinations of multiple data sets. Some examples of user situations are described below, including situations where an easy conditional remapping method resolves a problem.

Scenario 1: Database Engines

Karl is a data scientist for a software company. He wants to understand which database connectors Tableau supports versus popular databases on the market. To do this, he needs to join Tableau connectors to DB-Engines data, but the database names are frequently very different. He also has to edit the applied join clauses to get a clean join. With conditional remapping, he can do this with 30 simple edits. Previously, he would use a combination of a spreadsheet application and a custom R program to collect and edit this data.

Scenario 2: Customer Feedback Suggestions

Mary is a user experience researcher for a company. Throughout alpha and beta product releases, many customers logged suggestions on the company site. These comments need to be categorized into groups so that Mary can monitor and trend them over time. Standard methods of group and replace are possible, but Mary wants each edit to be based upon the "suggestion ID" value. Previously, Mary mapped the values in a spreadsheet but also had to write vlookups or copy and paste when she got new data. This pain discouraged her from monitoring the customer suggestions more frequently, thus making it more difficult for her to do her job. With conditional remapping as taught here, Mary can do her job more efficiently.

Scenario 3: Sales Corrections

Sales analysts at retail sales outlet sometimes find incorrect sales amounts or stages that needed to be manually overridden for analytical purposes. The analysts may need to override a specific sales order. They do not want to update all orders, nor do they want to update all domain values. Their current solution is to have analysts fill out an override form, send it to their data warehousing team, and ask the data warehouse team to reload sales data. This takes hours and delays their ability to quickly report on sales numbers. With conditional remapping, analysts can directly modify the desired values and mappings.

Scenario 4: Tableau Registrations

An earlier workflow for Conference Registrations involved joining a small spreadsheet to a large relational table. Being able to edit directly in the Data Prep application 230, users never need to perform a join and can simply add the data directly through a group and replace operation.

Scenario 5: Single Conditional Group and Replace

As an example of creating a single conditional group and replace, Arthur is mapping Project suggestions. He follows these steps. Arthur selects multiple domain values across several columns. He selects the 'group and replace' or 'edit' button. The Data Prep application 230 visually indicates which columns are conditions versus not conditions. The system allows Arthur to edit the last value selected. Arthur replaces the last selected value with the appropriate value and commits the action. The system records the change, adds an annotation, and updates the data to reflect the replacement.

Figure 4A:
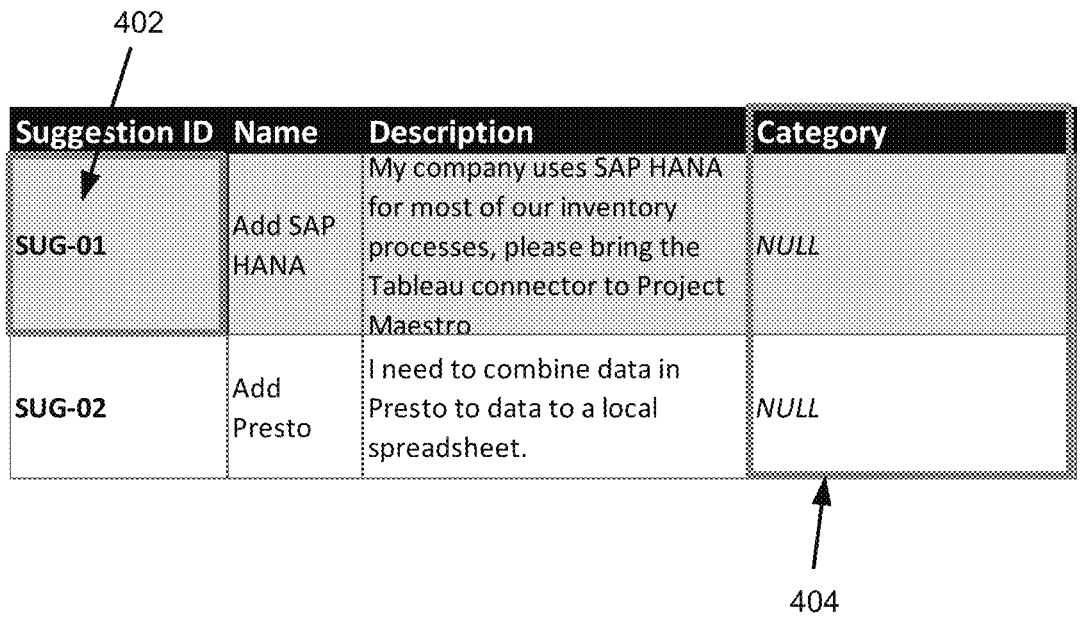
FIGS. 4A and 4B illustrate using a conditional replace function in accordance with some implementations.
Figure 4B:
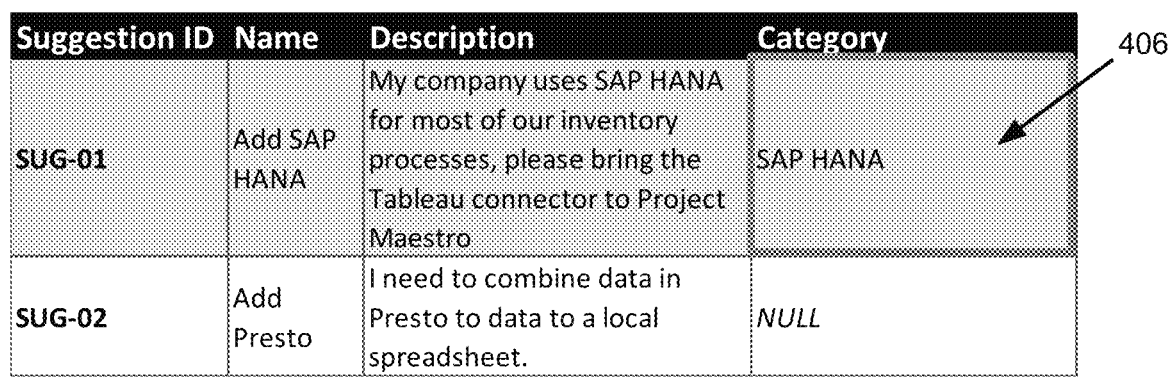

FIGS. 4A and 4B shows what occurs if Arthur wants to change Category: NULL 404 to Category: Connectivity—SAP HANA 406 for Suggestion ID: SUG-01 402.

In these cases, Suggestion ID="SUG-01" and Category=NULL are the conditions and "SAP HANA" 406 is the replacement value.

When a conditional group and replace is used, as shown in FIGS. 4A and 4B, it provides replacement verbiage, such as: "NULL replaced by 'SAP HANA' when [Suggestion ID] is 'SUG-01'; When [Suggestion ID] is 'SUG-01' and [Suggestion Category] is NULL then 'SAP HANA' replaces NULL."

When a conditional replacement is no longer valid or is incorrect, Arthur can edit the operation and preserve his edits. When editing, Arthur can see the conditional values and correct them if necessary. For example, there may be a typo, either in the source data or from a previous cleaning operation performed by the user. In some instances, it is desirable to change the replacement value. For example, Arthur initially wrote "SPA HANA" and needs to change it to "SAP HANA." In some instances, it is desirable to change the condition values. For example, "Springfield" is changed to "spring field" in the source system and Arthur needs to update the condition value to map properly. In some instances, it is desirable to add another column condition. For example, there are now multiple SUG-01 rows. One such row should refer to SAP HANA, and the other refers to Kinetica. Arthur wants to add a field called "Suggestion Line ID" as a condition and add a specific value related to that condition.

In some implementations, it is also possible to edit a conditional replacement in the following way. Arthur selects and edits an annotation. The system displays all columns and values involved in the conditional edit. The desired conditional edit includes both the original value and the replacement value. Arthur is able to change any of the values and apply the change. The system subsequently checks whether the new values are in or out of the sample. If they are out of the sample, the UI notates it (e.g., through highlighting the values that are out of the sample). Arthur can also remove an entire condition.

Figure 6:
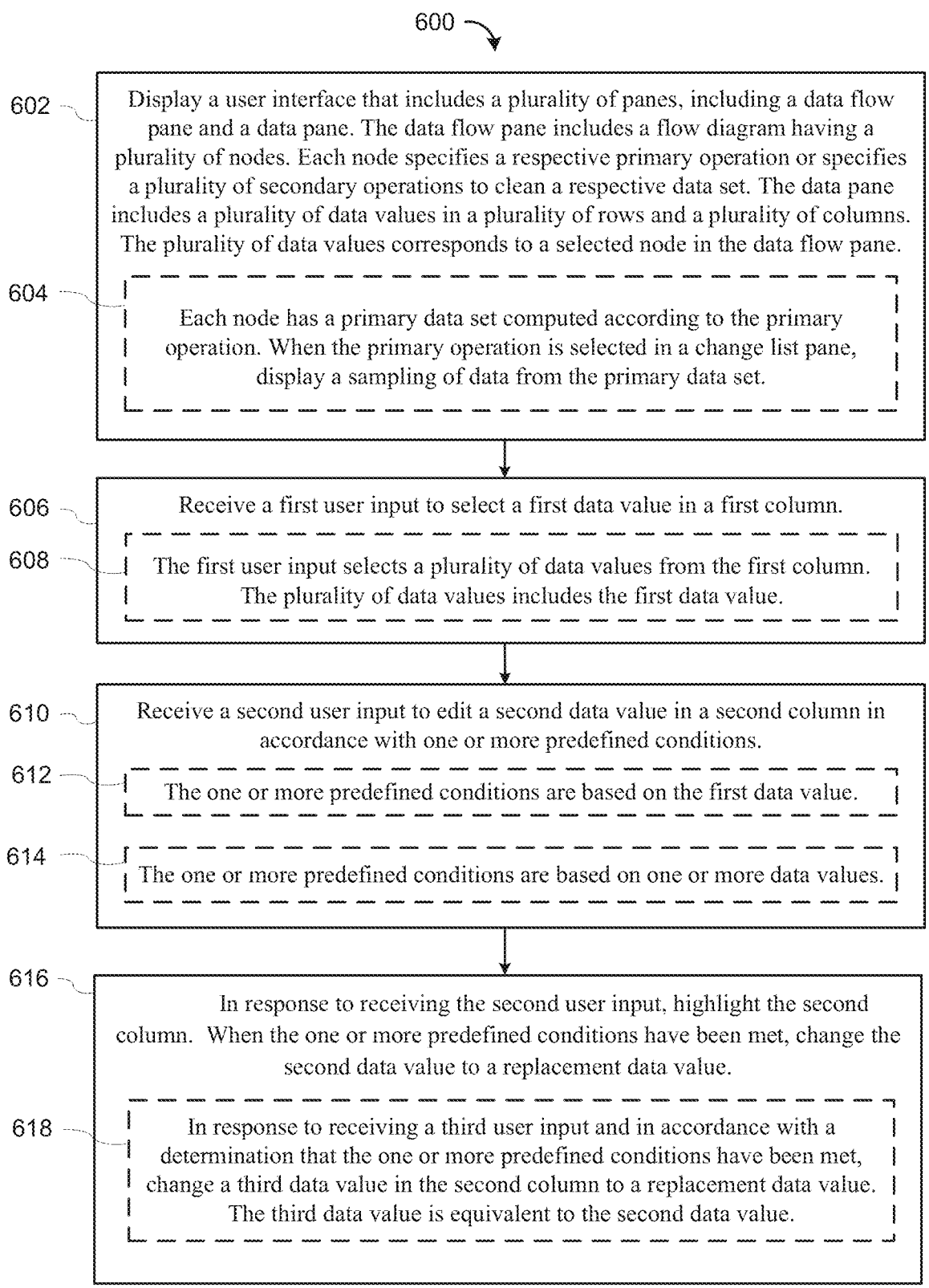
FIG. 6 provides a flowchart for performing conditional replace operations, in accordance with some implementations.

FIG. 6 provides a flowchart 600 of a process of using an interactive method to dynamically prepare a data set in accordance with some implementations. The method is typically performed at a computer 200 having a display 208, one or more processors 202, and memory 214 storing one or more programs configured for execution by the one or more processors.

The method 600 displays (602) a user interface 300, which includes a plurality of panes, including a data flow pane 313 and a data pane 315. The data flow pane includes (602) a flow diagram having a plurality of nodes (e.g., the nodes 502, 504, and 506 in FIG. 5A). Each node specifies (602) a respective primary operation or specifies one or more secondary operations to clean a respective data set. The data pane 315 includes a plurality of data values in a plurality of rows and a plurality of columns. The plurality of data values corresponds to a selected node in the data flow pane 313.

In some implementations, each node in the plurality of nodes has (604) a primary data set computed according to the primary operation. In some implementations, when the primary operation in selected in a change list pane, the method displays a sampling of data from the primary data set.

The method receives (606) a first user input to select a first data value in a first column. In some instances, the first user input selects (608) a plurality of data values from the first column. The plurality of data values includes the first data value.

The method receives (610) a second user input to edit a second data value in a second column in accordance with one or more predefined conditions. In some implementations, the one or more predefined conditions are based (612) on the first data value. In some implementations, the one or more predefined conditions are based (614) on one or more data values.

In response to receiving the second user input, the method highlights (616) the second column. In accordance with a determination that the one or more predefined conditions have been met, the method changes the second data value to a replacement data value.

In some implementations, in response to receiving a third user input and in accordance with a determination that the one or more predefined conditions have been met, the method changes (618) a third data value in the second column to the replacement data value. The third data value is equivalent to the second data value.

The disclosed data prep systems 230 give control to users. In many cases, the data prep application 230 makes intelligent choices for the user, but the user is always able to assert control. Control often has two different facets: control over the logical ordering of operations, which is used to ensure the results are correct and match the user's desired semantics; and physical control, which is mostly used to ensure performance.

The disclosed data prep applications 230 also provide freedom. Users can assemble and reassemble their data production components however they wish in order to achieve the shape of data they need.

The disclosed data prep applications 230 provide incremental interaction and immediate feedback. When a user takes actions, the system provides feedback through immediate results on samples of the user's data, as well as through visual feedback.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for preparing data for subsequent analysis, comprising:
   at a computer system having one or more processors and memory storing one or more programs configured for execution by the one or more processors:

displaying a user interface that includes a plurality of panes, including a data flow pane and a data pane wherein:
  the data flow pane includes a flow diagram having a plurality of nodes, each node specifying a respective primary operation or specifying a plurality of secondary operations to clean a respective data set; and
  the data pane includes a plurality of data values in a grid having a plurality of rows and a plurality of columns;
receiving user selection of a node, in the data flow pane, the node representing a join operation that specifies joining a first column and a second column from a first table to columns in a second table;
in response to the selection of the node, displaying data values for a data set corresponding to the node, in the grid in the data pane;
receiving a user input in the grid to edit a first data value in the first column in a first row of the grid, changing the first data value to a replacement data value;
identifying a second data value in the second column in the first row;
identifying one or more additional rows in the grid, other than the first row, whose data values for the first column and the second column match the first data value and the second data value; and
  updating the data values in the first column of the one or more additional rows to the replacement data value.

2. The method of claim 1, wherein the user interface further includes a profile pane that displays results of the join operation.

3. The method of claim 2, wherein the results of the join operation are updated in accordance with updated data values in the first column of the one or more additional rows.

4. The method of claim 1, further comprising, highlighting the one or more additional rows in the grid, other than the first row, that have been identified as having data values for the first column and the second column matching the first data value and the second data value.

5. The method of claim 1, wherein each node of the plurality of nodes has a primary data set computed according to the respective primary operation, and the method further comprises:
  in response to receiving a second user input to select the primary operation in a change list pane, displaying a sampling of data values from the respective primary data set.

6. The method of claim 1, wherein:
updating the data values in the first column of the one or more additional rows to the replacement data value comprises a cleaning operation; and
the method further comprises adding a cleaning operation icon, to the data flow pane, that represents the cleaning operation.

7. A computer system comprising:
one or more processors;
memory; and
one or more programs stored in the memory and configured for execution by the one or more processors, the one or more programs comprising instructions for:
  displaying a user interface that includes a plurality of panes, including a data flow pane and a data pane wherein:
    the data flow pane includes a flow diagram having a plurality of nodes, each node specifying a respective primary operation or specifying a plurality of secondary operations to clean a respective data set; and
    the data pane includes a plurality of data values in a grid having a plurality of rows and a plurality of columns;
  receiving user selection of a node, in the data flow pane, the node representing a join operation that specifies joining a first column and a second column from a first table to columns in a second table;
  in response to the selection of the node, displaying data values for a data set corresponding to the node, in the grid in the data pane;
  receiving a user input in the grid to edit a first data value in the first column in a first row of the grid, changing the first data value to a replacement data value;
  identifying a second data value in the second column in the first row;
  identifying one or more additional rows in the grid, other than the first row, whose data values for the first column and the second column match the first data value and the second data value; and
  updating the data values in the first column of the one or more additional rows to the replacement data value.

8. The computer system of claim 7, wherein the user interface further includes a profile pane that displays results of the join operation.

9. The computer system of claim 8, wherein the results of the join operation are updated in accordance with updated data values in the first column of the one or more additional rows.

10. The computer system of claim 7, wherein the one or more programs further comprise instructions for highlighting the one or more additional rows in the grid, other than the first row, that have been identified as having data values for the first column and the second column matching the first data value and the second data value.

11. The computer system of claim 7, wherein each node of the plurality of nodes has a primary data set computed according to the respective primary operation, and the one or more programs further comprise instructions for:
  in response to receiving a second user input to select the primary operation in a change list pane, displaying a sampling of data values from the respective primary data set.

12. The computer system of claim 7, wherein:
updating the data values in the first column of the one or more additional rows to the replacement data value comprises a cleaning operation; and
the one or more programs further comprise instructions for adding a cleaning operation icon, to the data flow pane, that represents the cleaning operation.

13. A non-transitory computer-readable storage medium storing one or more programs configured for execution by a computer system having one or more processors, memory, and a display, the one or more programs comprising instructions for:
  displaying a user interface that includes a plurality of panes, including a data flow pane and a data pane wherein:
    the data flow pane includes a flow diagram having a plurality of nodes, each node specifying a respective primary operation or specifying a plurality of secondary operations to clean a respective data set; and the data pane includes a plurality of data values in a grid having a plurality of rows and a plurality of columns;

receiving user selection of a node, in the data flow pane, the node representing a join operation that specifies joining a first column and a second column from a first table to columns in a second table;

in response to the selection of the node, displaying data values for a data set corresponding to the node, in the grid in the data pane;

receiving a user input in the grid to edit a first data value in the first column in a first row of the grid, changing the first data value to a replacement data value;

identifying a second data value in the second column in the first row;

identifying one or more additional rows in the grid, other than the first row, whose data values for the first column and the second column match the first data value and the second data value; and updating the data values in the first column of the one or more additional rows to the replacement data value.

14. The computer-readable storage medium of claim 13, wherein the user interface further includes a profile pane that displays results of the join operation.

15. The computer-readable storage medium of claim 14, wherein the results of the join operation are updated in accordance with updated data values in the first column of the one or more additional rows.

16. The computer-readable storage medium of claim 13, wherein the one or more programs further comprise instructions for highlighting the one or more additional rows in the grid, other than the first row, that have been identified as having data values for the first column and the second column matching the first data value and the second data value.

17. The computer-readable storage medium of claim 13, wherein each node of the plurality of nodes has a primary data set computed according to the respective primary operation, and the one or more programs further comprise instructions for:

in response to receiving a second user input to select the primary operation in a change list pane, displaying a sampling of data values from the respective primary data set.

18. The computer-readable storage medium of claim 13, wherein:

updating the data values in the first column of the one or more additional rows to the replacement data value comprises a cleaning operation; and the one or more programs further comprise instructions for adding a cleaning operation icon, to the data flow pane, that represents the cleaning operation.

\* \* \* \* \*